Nov. 9, 1954 N. I. STARK 2,693,807

FILE AND INDEXING DEVICE

Filed Dec. 7, 1948 3 Sheets-Sheet 1

INVENTOR

Nathan I. Stark

Nov. 9, 1954 N. I. STARK 2,693,807

FILE AND INDEXING DEVICE

Filed Dec. 7, 1948 3 Sheets-Sheet 2

INVENTOR

Nathan I. Stark

Nov. 9, 1954 N. I. STARK 2,693,807
FILE AND INDEXING DEVICE
Filed Dec. 7, 1948 3 Sheets-Sheet 3
FIG. 8
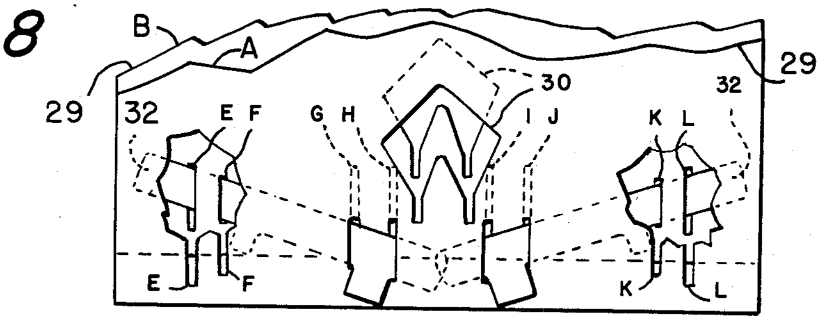
FIG. 9
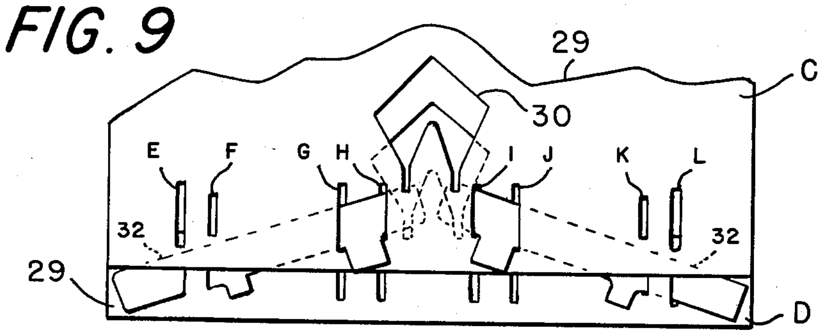
FIG. 10
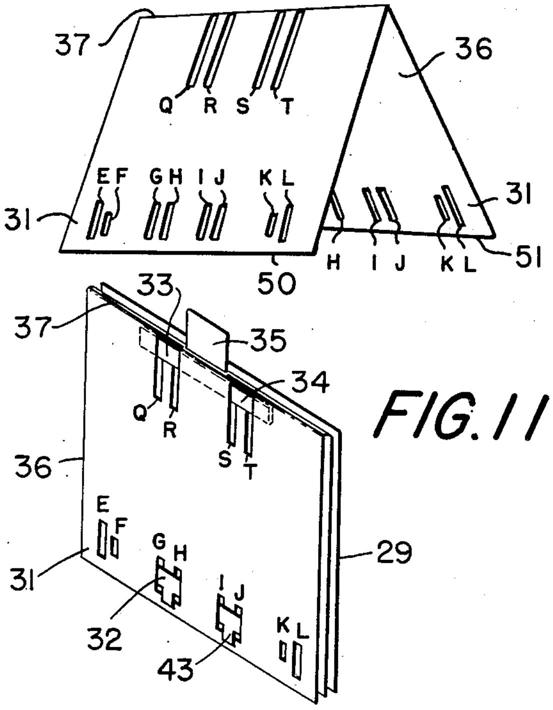
FIG. 10, FIG. 11
FIG. 12
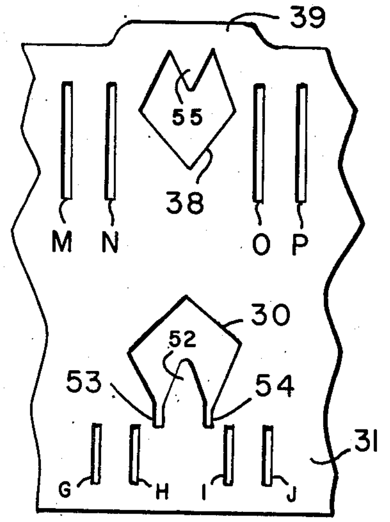
INVENTOR
Nathan I. Stark 2,693,807

FILE AND INDEXING DEVICE

Nathan I. Stark, West Orange, N. J.; Dorothy Stark, administratrix of said Nathan I. Stark, deceased Application December 7, 1948, Serial No. 63,931

13 Claims. (Cl. 129—16.5)

This invention relates to indexical devices such as guide cards and tabs therefor, filing pockets, and index cards. It has reference more particularly to indexical devices of the "visible index" type, in which records and data to be filed are incorporated on, attached to, or placed between suitable planar carriers or sheets, having appropriate indexing means. It embodies means for interconnecting a series of indexical units, so that displacement of any one carrier or sheet of a series will serve to actuate carriers or sheets at either side thereof, so as to bring one margin of each carrier or card into visible index relation with respect to the others, or, alternatively to move a plurality of carriers or sheets into spaced inclined planes so as to expose a larger surface area of each card or carrier of a group.

This application is a continuation-in-part of my application filed April 1, 1946, Serial No. 658,756, for Filing Device, and of my application Serial No. 39,848 filed July 21, 1948, for Indexical Album (now abandoned).

The present invention resides primarily in indexing devices having indexing sheets and connecting means, or having carriers or sheets to serve as guide cards for one or more record cards or index cards. The indexing devices are preferably used with standard file or card index housing. They may also be placed on flat surfaces, such as desk tops, where file records stand on their edges. Furthermore, they may be used as a portable or hand index, or may be accommodated in special size housing.

An important object of this invention is to provide an index means to operate at an angle, preferably at right angles to the plane of the carrier sheets or guide cards, which may also be used as an index means for standard index cards in conventional file boxes and file drawers.

Another important object is to provide a novel connection between a plurality of planar carriers or guide cards that will permit the operation of any one thereof to actuate progressively the adjacent carriers or cards, so as to bring as many units as desired into visible index relation.

Another object is to limit the vertical space needed for operation of the connecting means to dimensions only slightly greater than the width of the connecting means, and yet accommodate a much greater degree of vertical movement than the limited vertical space allowed would normally permit in standard equipment. Alternatively, a more substantial connecting means may be employed, while still leaving room to accommodate an effective degree of vertical movement in an index retained in standard housing units.

Another object is to provide connecting means in this invention that will not shift the position of an index card or record sheet relative to the guide or carrier which supports it when the guide or carrier is elevated into visible index relation.

A further object of this invention is to provide means that will permit subject matter carried adjacent the upper edges of the connecting means to drop sufficiently to prevent indicia on the guide cards from being obstructed when the guide cards are elevated into visible index relation.

Another object is to provide carriers serving as guide cards with retaining means for cooperation with the connecting means to prevent accidental displacement of index cards or sheets carried by said carriers.

A still further object of this invention is the provision of a carrier pocket or like means for suspending groups of connected guide cards or carriers of this invention over sheet-like partitions, or over substantially parallel bars loosely supported in a horizontal plane for free movement toward and from each other without breaking the continuity of the connection between guide cards or carriers.

Another still further object of this invention is to provide a file and indexing device having each guide card or carrier thereof connected by a plurality of flexible and/or resilient strips, so as to provide smooth interaction, expansibility, and torsional hinging as between guide cards or carriers.

Yet another object of this invention is to provide an extendible, removable, sliding pull tab, interchangeable with all guide cards, and adapted to slide partway down between the guide cards.

Further objects and advantages will be apparent from the following description of an index embodying the principles of this invention, illustrated in the accompanying drawings, wherein:

Fig. 8 is a fragmentary view in front elevation of two connected carriers similar in construction to that shown in Fig. 7; but showing the position of the connecting link between carriers when the rear carrier has been elevated into visible index position with respect to the front carrier;

Fig. 9 is a view similar to Fig. 8, but illustrating the relationship when the front carrier has been elevated above the rear carrier;

Fig. 10 is a perspective view of a folded carrier, adapted to serve as a continuity sectionalizing means, as a sheath, or as a pocket-forming carrier;

Fig. 11 is a perspective view of the folded carrier shown in Fig. 10 with a single-thickness guide card and index tab in assembled relation thereto;

Fig. 12 is an elevational view of a portion of a modified carrier of the type shown in Fig. 7.

Figure 1:
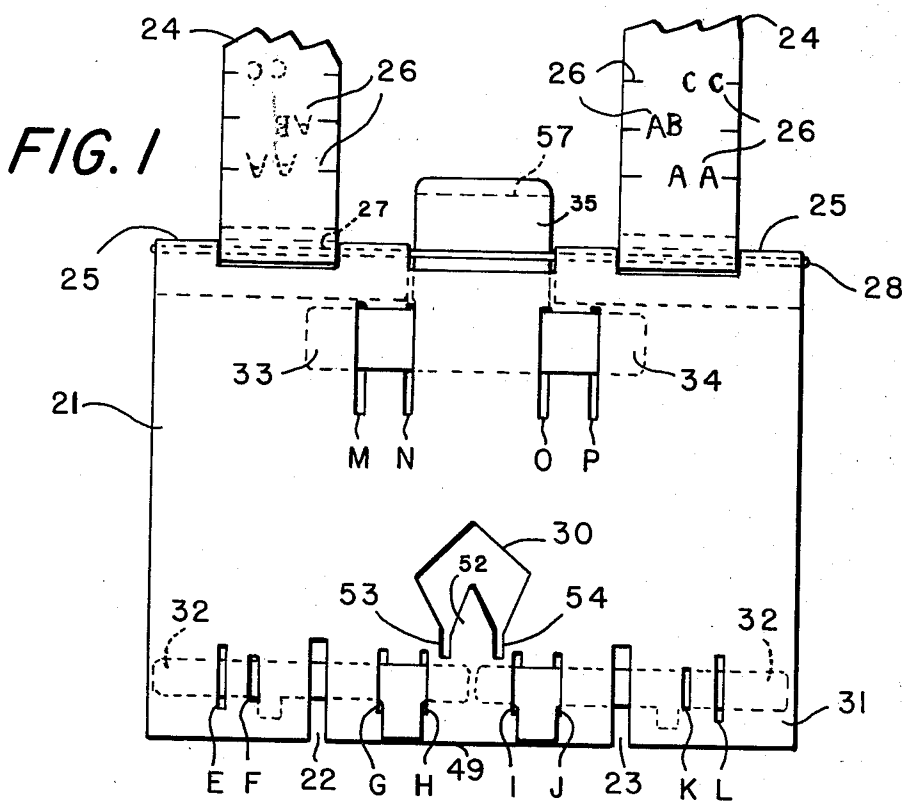
Fig. 1 is a rear elevational view of a carrier, guide card, or sheet provided with index and pull tabs assembled thereon.
Figure 6:
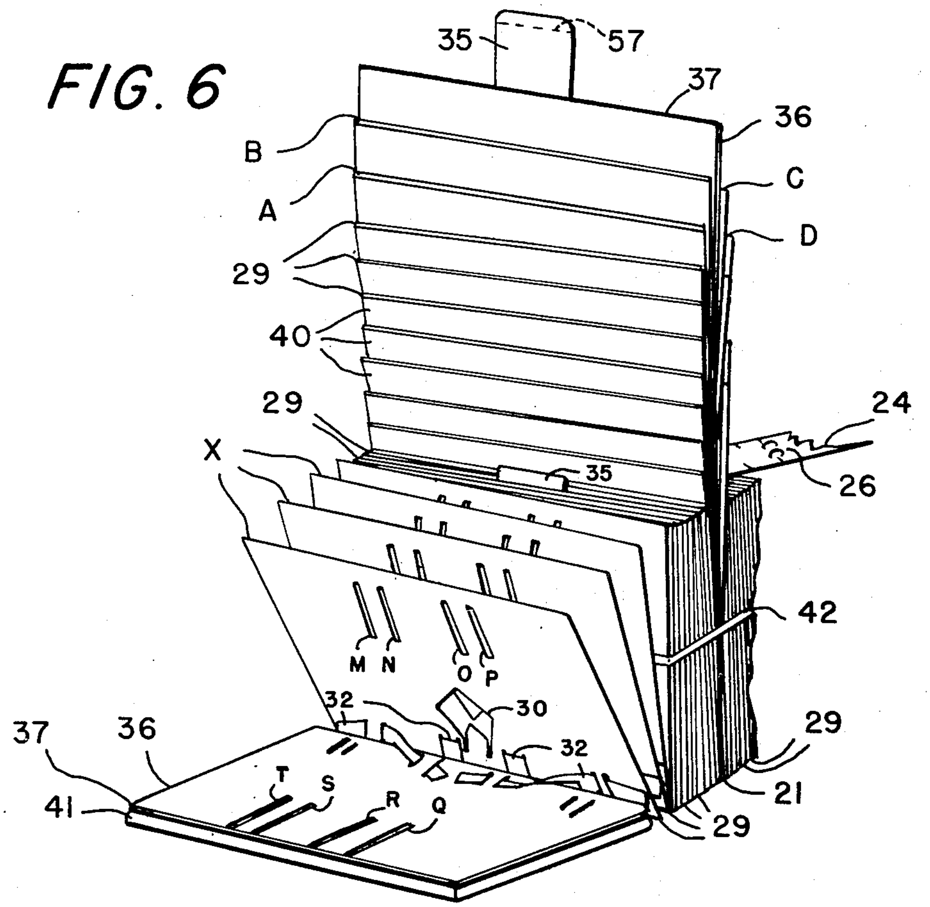
Fig. 6 is a fragmentary perspective view illustrating units of this invention in assembled relation, omitting the housing, but illustrating methods for using the index.
Figure 7:
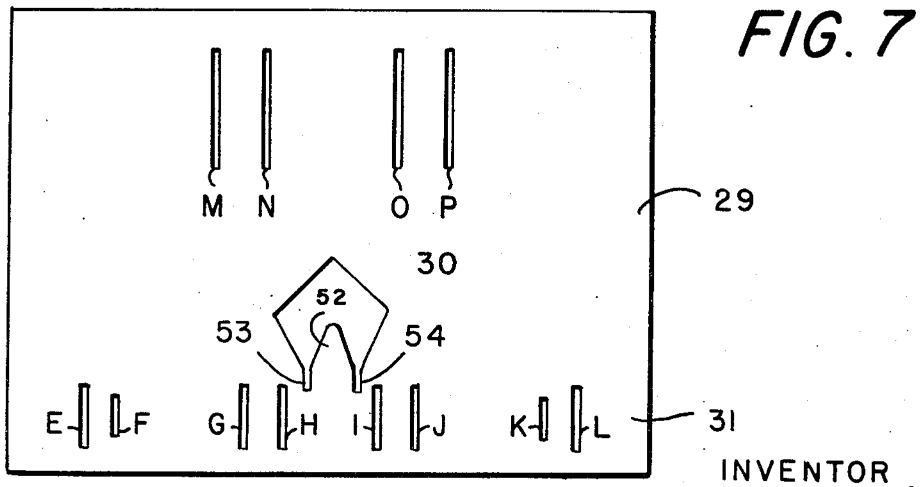
Fig. 7 is a face view in elevation of a guide card carrier or planar sheet similar to one shown in Fig. 1, but omitting the index tabs, index tab hinge means, and certain guide openings in the lower edge.

Referring to the drawings:

The guide card of this invention may comprise a planar sheet 21, as seen in Fig. 1, with openings 22 and 23 at its lower edge and one or more index tabs 24 swinging freely from its upper edge 25. The tabs may carry indicia 26 suitably spaced from the hinge line. Alternatively, where a plurality of guide cards, carriers or planar sheets are used in a group, as seen in Fig. 6, most of the sheets may be formed without tabs, as seen in Fig. 7, at 29. The guide card is preferably constructed from relatively stiff or flexible fibrous or plastic sheeting, that may be either transparent or opaque. It is cut or punched to form card-retaining means 30, 52, 53 and 54, located centrally and is also punched or cut to provide a series of slots E–F—G–H—I–J—K–L spaced apart adjacent its lower margin 31, and a series of slots M–N—O–P spaced apart adjacent its upper margin. Slot openings G–H—I–J engage a pair of connecting links 32; and slot openings M–N—O–P engage pull tab arms 33, 34 of pull tab 35. Instead of single thickness guide cards shown in Fig. 7, a double thickness card may be used. This is shown in Fig. 10, wherein a carrier sheet 36 is folded on a medial line 37, thus defining a pocket or sheath, which may be closed when its coincident openings are engaged together along the lower margins 31 by connecting links 32. For such purposes, the sheath is preferably constructed from transparent material such as Celluloid or the like.

The sheath is preferably used in combination with carriers 29, the slot openings of which are positioned to register with those of the sheath. The slot openings Q–R—S–T for pull tab 35 in the sheath are, however, of greater length than slot openings M–N—O–P in carrier 29, and terminate at fold 37, so as to give greater pull strength by permitting the ends 33 and 34 of pull tab 35 to abut against the inner side of the fold. At the same time, this permits a uniform minimum projecting height for all pull tabs.

The connecting links 32 may vary in length, size and number, depending on the size of sheet or carrier to be engaged. Not less than two, preferably a pair, are used to obtain pivotal link action described herein.

The housing for this invention is not shown in the drawings, but it may be of the type used for standard index cards or records, either file drawers or box receptacles. If the housing has a suitably angled or expanding front plate and follower block, the movement of carriers X (Fig. 6) into spaced inclined planes is greatly facilitated.

Connecting links 32, shown in various figures, are preferably made of a resilient material such as Celluloid sheeting, or formed from any other suitable plastic material having substantially the same resilience as Celluloid. Thin spring brass or steel connecting links are also effective, but are not as readily cut and formed as Celluloid sheeting or the like. Less resilient connecting links may advantageously be used for larger carriers, or for installations in which it is not desired to fan the carriers out into spaced inclined planes, but only to elevate them into visible index relation, that is, in parallel vertical planes.

Figure 5:
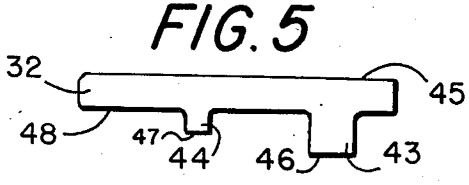
Fig. 5 is a view in elevation of a connecting link.

Connecting links 32 (see Fig. 5) are provided along one edge with tongues 43 and 44. Tongue 43 extends a greater distance from the opposite edge 45 of the link than does tongue 44. The distance from edge 45 to the free edge 46 of tongue 43 is greater than the length of the slot openings G–H or I–J, provided to receive the strip 32. The slot and tongue thus operatively interlock one end of the connecting link with a carrier, the engagement or removal of link 32 of these openings being made by flexing each link so that its lateral portions to either side of the tongue 43 may be inserted or removed through slot openings G–H and I–J. Since the free edge 47 of tongue 44 is a shorter distance from the opposite edge 45 of the connecting link than the free edge 46 of tongue 43, the small tongue 44 is able to pass through the openings G–H and I–J.

Slot openings E—G–H—I–J—L in carriers 21, 29 and 36 are substantially of equal length. They extend at right angles to edges 49, 50 or 51, and are disposed along the lower marginal portions in substantially parallel alignment. Slot openings F—K are substantially shorter than the openings just considered, but are of slightly greater dimension than the neck of the link 32; that is, they are longer than the distance from edge 45 to edge 48 of the neck, but are not long enough to pass tongue 44, which therefore will abut against the slot F or K and prevent relative lateral movement of interconnected carriers. The smaller or pivotal slot openings F—K are disposed in spaced parallel relation inwardly of the adjacent slot openings E—L. The longer end neck portion of link 32 passes through the pivotal slot opening F or K of an adjacent carrier and back through outer slot E or L thereof, and thus completes engagement between any two adjacent carriers in a series.

From inspection of Figs. 1, 8 and 9, it will be seen that the short end of the left-hand link 32 (shown in Fig. 5) passes through the left-center slot H and extends towards the right hand edge of the card, while the long end of the link 32 passes through the adjacent outer slot G, and extends towards the left-hand edge of the card. Tongue 43 is so dimensioned that it will pass neither of these slots. It therefore serves to firmly position the link 32 as against lateral displacement relative to the carrier. The long end of link 32 is now passed through the left-hand pivotal slot F of the carrier which lies immediately behind, until the short tongue 44 abuts against that slot. The left-hand end portion of the link 32 then passes through the slot E which is nearest to the left edge of the rear carrier, so that the free ends of the link 32 shown lie in the space between the two adjacent carriers. This is most clearly seen in Fig. 8, where a portion of the front carrier has been broken away to show how the link 32 interlocks with the rear carrier.

Retaining means to mount an index card in a carrier, such as carriers 21 or 29, comprise a tapering tongue 52 projecting upwardly in an opening of greater size than the tongue. The sides of this opening converge inwardly above and below its central horizontal line, which marks its greatest width, and two of its lower converging sides terminate in slots 53 and 54, disposed in parallel relation to each other at either side of the tongue 52. These slots terminate, at their lower ends, at or just above the upper edges 45 of links 32 when those links are in neutral position as shown in Fig. 1. The distance between the upper tip of the tongue and the top of the opening in which it lies is greater than the range of movement through which engaged links 32 will permit the carriers to move when elevated into visible index relation. This will prevent the tongue from interfering with smooth operation of the invention, for it will ensure that the tongue will not catch on edges of openings in adjacent carriers, particularly if there does not happen to be an index card mounted in a couple of adjacent carriers at the time when they are moved into spaced inclined planes.

Figure 4:
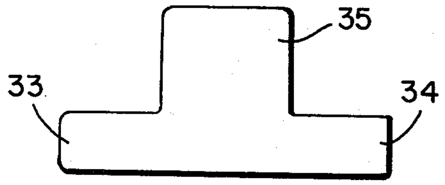
Fig. 4 is a view in elevation of one of the pull tabs.

The slots 53 and 54 engage the bottom of the record card centrally, while the upper edges 45 of right- and left-hand links 32, being substantially in alignment with the lower edge of the slots 53 and 54, support the card to either side of the central positions, and keep it from tilting. The root of the tongue between slots 53 and 54 serves to prevent the innermost ends of links of an adjacent carrier from catching the lower edge of a record card engaged in these slots and from displacing it out of its intended position.

Where vertical or horizontal space saving is not of great importance, the retaining tongue may be disposed a greater distance above the tops of the connecting links 32; and a plurality of oppositely-disposed cut-outs, such as the tongue 55 in aperture 38 in Fig. 12, may be disposed in vertical and/or horizontal alignment to serve as additional retaining means. The relation in spacing as between tongue and cut-out should be substantially the same as described for tongue 52. In order to carry the index card as close to the top of the carrier as possible, so as to improve visibility, a central tab 39 may be provided on the carrier. In this way, the upper aperture 38 may be so located that the root of the tongue 55 is in alignment with the upper edge of the carrier. The upper edge of an index card mounted under tongue 55 will then be at the same level as the top of the carrier. When a carrier having a projecting tab 39 is used, it is, of course, desirable to use with it a pull tab having somewhat greater height than that illustrated in Figure 4, so that its upper edge will not be obscured by the tab 39 which lies ahead of it.

The folded carrier 36, shown in Figs. 6, 10 and 11, has many uses. If made of transparent material, it may serve as a protecting sheath for carrier 29, or as a transparent pocket. Whether transparent or not, it may be converted into a pocket carrier for records of varying sizes, its lower end being closed when the links 32 have been threaded through it. It is apparent that the use of folded guide cards of this type facilitates adaption of the index as a whole to index housing units of the type which support the cards by suspending them in fabric hammocks, since the transverse rods which would normally hold the hammock may be inserted instead directly beneath the fold in each carrier.

The material used for constructing this folded carrier is selected in accordance with the nature of the use to which it is to be put. An advantage of the folded carrier is that there is less risk of displacing material filed between carriers when a group of carriers is moved into visible index position. A disadvantage is that the amount of space required for housing a given amount of material is nearly doubled when folded carriers are used.

Figure 2:
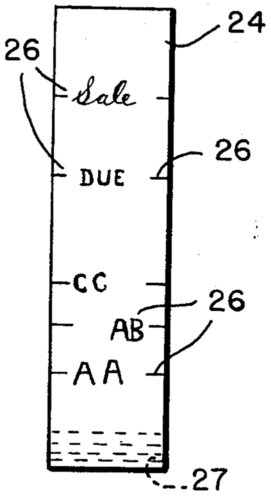
Fig. 2 is a plan view of an index tab, such as that fragmentarily shown as hinged to a planar carrier in Fig. 1.
Figure 3:
Fig. 3 is a side view of Fig. 2.

Referring now to the hinged indexing tab 24, shown in Figs. 1, 2 and 3, it will be seen that the hinge means permits the tab to swing freely from the upper edge 25 of the guide card or carrier 21. The tab itself is preferably made of a material such that the indicia 26 may be easily written or inscribed thereon, and erased therefrom with a rubber eraser or other suitable erasing means. A preferred durable material found for this purpose is plastic sheeting, such as Celluloid sheeting, having its polished surface treated with a suitable abrasive to remove the polish and provide a surface adapted to receive ink or pencil markings, from which such markings may be readily removed with an ordinary rubber eraser or a damp cloth. Single or double index tabs may be used, and both faces of such tabs may carry indicia.

Pulley tab 35 is also preferably made from plastic or Celluloid sheeting material, because of its durability. Each pull tab is properly spaced within a series of connected carriers so as to divide the different sections to be indexed. The indicia 26 are inscribed on the hinged index tab in spaced relation from its hinge, appropriate markings will then appear opposite each pull tab on a series of cards or carriers when these have been brought into a compact vertical position.

With reference to the pull tab 35, it may be noted that, when the index is not in use, this tab drops to the bottom of the slots M–N—O–P, leaving exposed no more than the small extension above the dotted line 57. This is sufficient to locate the pull tab quickly, and to elevate it into a position where it may be firmly grasped for moving the carriers into visible index relation.

Slot openings Q–R—S–T are usually omitted when transparent pocket carriers or integral record sheets are used, especially if a folded record sheet is used which has one side so much shorter than the other that the bottom edge of the short side will lie above the connecting links 32. This type of record sheet may be opened out to expose a greater surface, without disturbing other carriers or cards in the file.

In the operation of the invention, the inner ends of the links 32 are inserted through the carrier first, and then the respective outer ends are engaged in the adjacent carrier, as previously described. When a series of elements has been assembled and interlocked in this way, the carriers may be moved into spaced inclined planes (see the cards marked X in Fig. 6) and in so doing impose a torsional twist on the connecting links. The degree of inclination of the plane of each carrier will depend on the resilience of the link and the degree of twist imparted to the neck portion of the links between engaging openings in adjacent carriers. As illustrated here, the device is adapted for relatively small size records. When housing space permits, more or longer links may be provided. However, when this is done, shorter engaging slots should be used, as the angle of pivotal movement of the links will be less than will be required when shorter links are used and the cards are moved into visible index relation. With larger record carriers, it may be desirable to have three or more links so as to provide a more extended support for the lower margins of records housed between the sheets, and to retain the smaller supplementary record papers.

The preferred method of engaging folded carriers 36 is to treat the folded carrier as though it were a single-thickness card. Where the folded carrier has one side shorter than the other (that is, terminating at the line just above the tops of the slots along the lower margin of the longer side), the manner of interconnecting the carrier will be exactly the same as for the single-thickness card 29, shown in Fig. 7.

A hinged index tab such as indicated at numeral 24 in Fig. 1 is particularly important in association with devices of the type herein disclosed, since there is not sufficient room in a standard filing cabinet to accommodate the conventional rigid index tab, and still provide for the installation of the connecting links 32 at the bottom thereof.

The openings 22 and 23 in Fig. 1 serve to permit insertion of the sheet which carries the indexing tabs between any two adjacent carriers in a series. The card is simply inserted into the index, and straddles the interconnecting links 32 intermediate the space between slots F–G and J–K. For devices using more than two interconnecting links 32, the cards which bear the index tabs should be provided with additional openings, such as 22, 23. Alternatively, the hinged index tabs may be mounted upon a separate card of a size to be received between upper and lower tongues 52 and 55 in a carrier of the type illustrated in Fig. 12.

The provision of one major card carrying a hinged index tab, as just described, would make it possible to dispense with a substantial number of independent indexing guide cards. A line may be inscribed on the hinged Celluloid index tab approximately at the point where an indexing guide card would normally be inserted in an index. This is sufficient to indicate the point at which cards should be separated in searching for a desired item.

While I have illustrated and described the preferred form of construction for carrying my invention into effect, this embodiment is capable of variation and modification without departing from the spirit of the invention. I therefore do not wish to be limited to the precise details of construction set forth, but desire to avail myself of such variations and modifications as come within the scope of the appended claims.

What I claim is:

1. In an indexical device, the combination which comprises a plurality of index components adapted to be housed in filing drawers of standard dimensions and having interconnecting means interlaced between lower marginal portions thereof, a guide card having means for supporting an index card of standard size above the upper edges of said interconnecting means, an index tab, and means positioned adjacent the upper edge of said card loosely engaging said tab and accommodating elevational movement thereof into a position in which it extends beyond the clearance limits of such filing drawer.

2. In an indexical device, the combination defined in claim 1, wherein the index tab engaging means consists of two pairs of vertically-extending slots, spaced apart at least as far as the portion of the tab which extends above drawer-clearance limits, and the tab is provided with lateral extensions interlaced between said slots.

3. In an indexical device, the combination defined in claim 1, wherein the index tab is hingedly secured to an upper edge of the card.

4. In an indexing device, the combination of a plurality of carriers having planar bodies and a series of apertures generally aligned crosswise of the carriers and positioned adjacent the lower margin thereof, at least one of said openings being of substantially smaller dimension than its neighbors, the openings in one carrier being formed to register with those in adjacent carriers; and an interconnecting link passing snugly through a small opening in one carrier and engaging, with limited freedom of movement, a large opening in an adjacent carrier which opening is in offset relation to the small opening mentioned.

5. The device of claim 4, wherein the link is in the form of a flat, narrow ribbon of resilient material.

6. The device of claim 5, wherein the ribbon is provided, in a region intermediate its ends, with a marginal projection too great to pass the small opening.

7. The device of claim 5, wherein the ribbon is widened by a marginal projection in a region intermediate its ends to a width greater than the vertical dimension of the larger openings.

8. The device of claim 4, wherein at least one of the carriers comprises a sheet folded double to form a file pocket open at each side but closed by the fold at the top and by the link means passing through said openings at the bottom.

9. The device of claim 8, having a plurality of vertically extending horizontally spaced-apart slots, extending to the fold line from a region remote therefrom, and a pull tab having lateral wings along its lower margin, said tab being of less width than the space between two of said vertical slots, and said wings being configured to pass laterally through said slots with limited freedom for vertical movement therein.

10. The device of claim 4, wherein each carrier has two series of openings, one on each side of its vertical center line, and a separate link is provided for each series.

11. The device of claim 10, wherein the inner ends of said links lie near the center of the lower margin of the carrier, and a portion of the carrier is cut away to form an upwardly-extending card-supporting tongue having its root adjacent the upper edges of the inner ends of said links, whereby said tongue may prevent the inner ends of said links from fouling the lower edge of a card inserted in said cut-away portions between the carrier and the tongue.

12. The device of claim 10, wherein a downwardly-extending tongue and cut-away portion is provided, centrally disposed along the upper margin of the carrier, the root of the tongue being adjacent the upper edge of the carrier.

13. An indexing and filing assembly comprising a plurality of planar carriers and a plurality of interconnecting flat strips characterized in that, adjacent the lower margin of each carrier at least one group of four vertically-extending, horizontally spaced-apart slots is provided, the slots of any one carrier being congruent with those of any other carrier, one of the slots in a group of four slots being of substantially less vertical dimension than the remaining slots and being positioned between two slots of greater dimension; each interconnecting flat strip being characterized in that it is of substantially uniform height throughout most of its extent, and is proportioned to pass snugly through the slot of least dimension but to have freedom of movement in the slots of greater dimension whereby the slot of least dimension constitutes a pivot locus about which said strip has limited freedom for rocking movement.

References Cited in the file of this patent

UNITED STATES PATENTS

| Number | Name | Date |
|---|---|---|
| 868,458 | Lentz | Oct. 15, 1907 |
| 972,302 | Waller | Oct. 11, 1910 |
| 1,008,352 | Meyers | Nov. 14, 1911 |
| 1,194,422 | Rand et al. | Aug. 15, 1916 |
| 1,311,771 | Rand | July 29, 1919 |
| 1,554,864 | MacMillan | Sept. 22, 1925 |
| 1,648,082 | Walker | Nov. 8, 1927 |
| 1,867,471 | Power | July 12, 1932 |
| 1,973,989 | Lukacs | Sept. 18, 1934 |
| 2,064,737 | Daniels | Dec. 15, 1936 |
| 2,147,773 | Larson | Feb. 21, 1939 |
| 2,178,459 | Sherman | Oct. 31, 1939 |
| 2,260,407 | Schade | Oct. 28, 1941 |
| 2,295,952 | Jones et al. | Sept. 15, 1942 |
| 2,486,449 | Tucker | Nov. 1, 1949 |

FOREIGN PATENTS

| Number | Country | Date |
|---|---|---|
| 712,575 | France | 1931 |
| 559,422 | Germany | 1932 |
| 632,421 | Germany | 1936 |
| 527,530 | Great Britain | 1940 |
| 871,385 | France | 1942 |